US011128990B2

(12) United States Patent
Nakagawa

(10) Patent No.: US 11,128,990 B2
(45) Date of Patent: Sep. 21, 2021

(54) COMMUNICATION APPARATUS, CONTROL METHOD, AND STORAGE MEDIUM

(71) Applicant: CANON KABUSHIKI KAISHA, Tokyo (JP)

(72) Inventor: Toshiyuki Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 16/433,900

(22) Filed: Jun. 6, 2019

(65) Prior Publication Data

US 2019/0394618 A1 Dec. 26, 2019

(30) Foreign Application Priority Data

Jun. 20, 2018 (JP) .............................. JP2018-116885

(51) Int. Cl.
*H04W 4/06* (2009.01)
*H04W 84/12* (2009.01)

(52) U.S. Cl.
CPC .............. *H04W 4/06* (2013.01); *H04W 84/12* (2013.01)

(58) Field of Classification Search
CPC ..... H04W 84/12; H04W 84/18; H04W 80/04; H04W 8/26; H04W 88/06
USPC ....................................................... 370/338
See application file for complete search history.

(56) References Cited

U.S. PATENT DOCUMENTS

| 4,192,971 | A | * | 3/1980 | Morigami | ............. H04M 1/652 360/74.4 |
| 6,236,468 | B1 | * | 5/2001 | Otsuka | .................. H04M 1/652 358/400 |
| 6,799,214 | B1 | * | 9/2004 | Li | ..................... H04L 29/12066 709/226 |
| 8,090,765 | B2 | * | 1/2012 | Yoo | ...................... H04N 21/235 709/203 |
| 8,825,830 | B2 | * | 9/2014 | Newton | .................. H04L 67/42 709/223 |
| 9,285,955 | B2 | | 3/2016 | Nezu et al. | |
| 10,560,499 | B2 | * | 2/2020 | Vu | ........................ H04L 65/403 |
| 2002/0051081 | A1 | * | 5/2002 | Hori | ..................... G11B 27/005 348/553 |

(Continued)

FOREIGN PATENT DOCUMENTS

JP 2016-71638 A 5/2016
JP 2016071638 A * 5/2016 ............. G06F 13/00

*Primary Examiner* — Peter G Solinsky
*Assistant Examiner* — Sanjay K Dewan
(74) *Attorney, Agent, or Firm* — Canon U.S.A., Inc. IP Division

(57) ABSTRACT

Another communication apparatus reproducing a content stored in an external apparatus transmits an instruction for causing a communication apparatus to obtain the content stored in the external apparatus and reproduce the obtained content. Another communication apparatus also transmits a reproduction start timing of the content and information indicating a reproduction position of the content being reproduced by the another communication apparatus to the communication apparatus. If the received reproduction start timing has come, the communication apparatus starts reproducing the content. In starting to reproduce the content, the communication apparatus reproduces the content from a reproduction position at a subsequent time from the received reproduction position based on the reproduction start timing.

26 Claims, 6 Drawing Sheets

(56) References Cited

U.S. PATENT DOCUMENTS

| | | | |
|---|---|---|---|
| 2006/0161854 A1* | 7/2006 | Kim | H04N 21/431 715/764 |
| 2009/0240427 A1 | 9/2009 | Siereveld et al. | |
| 2011/0051020 A1* | 3/2011 | Kotani | H04N 9/3164 348/744 |
| 2012/0307146 A1 | 12/2012 | Watanuki et al. | |
| 2014/0012898 A1 | 1/2014 | Mittal | |
| 2014/0173025 A1* | 6/2014 | Killick | H04N 21/462 709/217 |
| 2014/0207911 A1* | 7/2014 | Kosmach | H04L 65/1083 709/218 |
| 2014/0297720 A1* | 10/2014 | Lim | H04N 21/442 709/203 |
| 2014/0342670 A1* | 11/2014 | Kang | H04M 1/7253 455/41.2 |
| 2014/0355763 A1* | 12/2014 | Lee | G06F 3/038 380/282 |
| 2015/0117340 A1* | 4/2015 | Kawakami | H04W 12/06 370/329 |
| 2015/0195147 A1* | 7/2015 | Jee | H04W 76/23 715/740 |
| 2015/0257129 A1* | 9/2015 | Yoon | H04W 72/02 370/312 |
| 2015/0358666 A1 | 12/2015 | Atake et al. | |
| 2016/0034245 A1 | 2/2016 | Karunakaran et al. | |
| 2016/0094648 A1* | 3/2016 | Han | H04W 12/003 709/209 |
| 2016/0135233 A1* | 5/2016 | Fujita | H04M 1/7253 370/329 |
| 2016/0173937 A1* | 6/2016 | Shih | H04N 21/436 725/37 |
| 2016/0173939 A1* | 6/2016 | Iwami | H04N 21/42206 725/139 |
| 2016/0192259 A1* | 6/2016 | Ogawara | H04W 76/10 455/436 |
| 2016/0286239 A1* | 9/2016 | Sato | H04N 19/44 |
| 2016/0337689 A1* | 11/2016 | Yoshimura | H04W 76/14 |
| 2016/0366468 A1* | 12/2016 | Seo | G06F 3/04842 |
| 2017/0006117 A1* | 1/2017 | Kafle | H04B 17/318 |
| 2017/0078740 A1* | 3/2017 | Iwami | H04N 21/43637 |
| 2017/0085938 A1 | 3/2017 | Yeom et al. | |
| 2017/0237930 A1 | 8/2017 | Kim et al. | |
| 2018/0070122 A1* | 3/2018 | Baek | H04N 21/440263 |
| 2018/0124719 A1* | 5/2018 | Kim | H04L 65/607 |
| 2019/0068701 A1* | 2/2019 | Han | H04L 67/1074 |
| 2019/0222885 A1* | 7/2019 | Cho | H04N 21/44231 |
| 2020/0053417 A1* | 2/2020 | Choi | H04N 21/41407 |

* cited by examiner

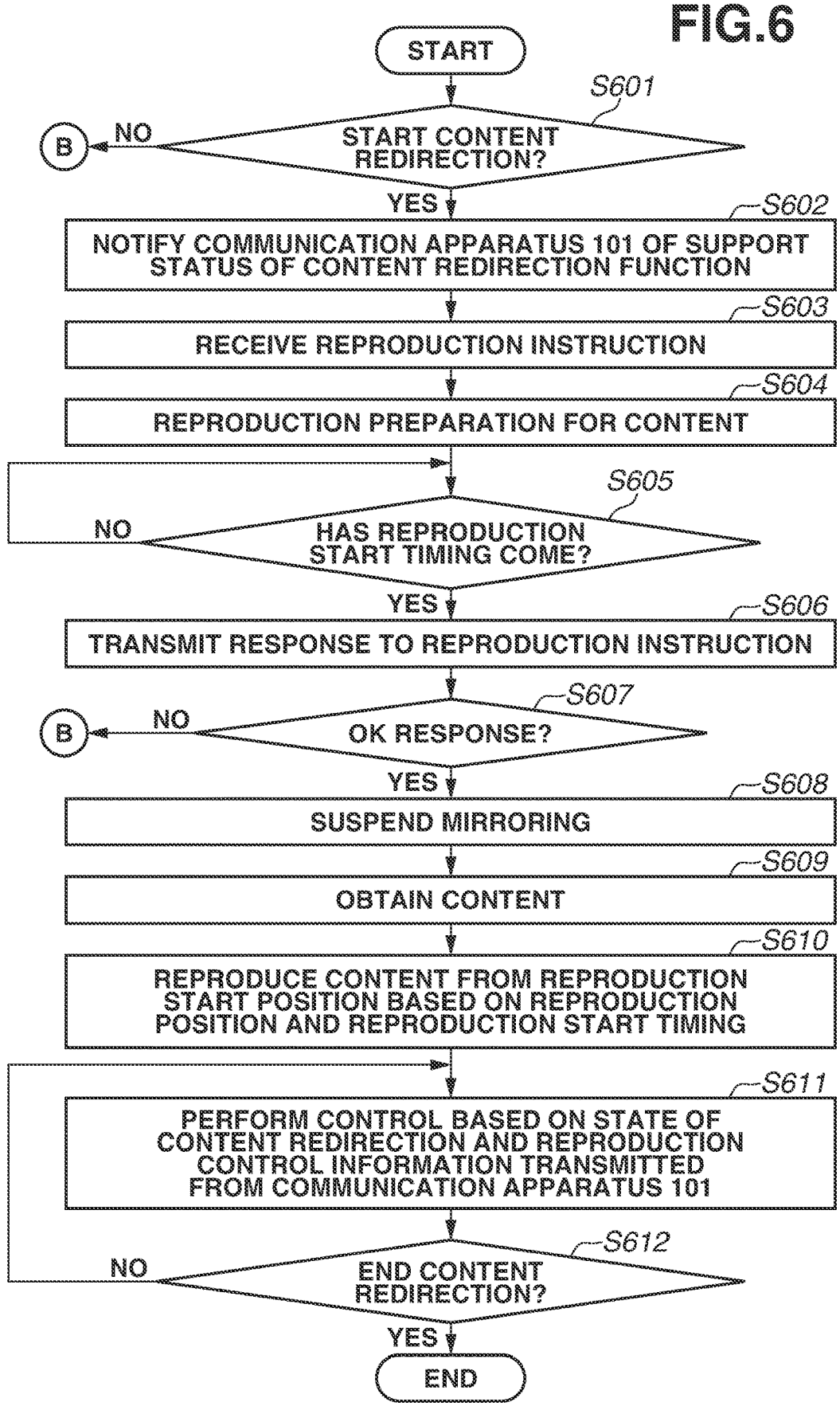

COMMUNICATION APPARATUS, CONTROL METHOD, AND STORAGE MEDIUM

BACKGROUND OF THE INVENTION

Field of the Invention

The present invention relates to reproduction of content by a communication apparatus.

Description of the Related Art

Some communication apparatus have a function capable of obtaining a content from an external apparatus and reproduce the obtained content based on a reproduction instruction transmitted from another communication apparatus. Such a function is referred to as a content redirection function. By the content redirection function, the communication apparatus receives location information about the content stored in the external apparatus from another communication apparatus, obtains the content from the external apparatus based on the received location information about the content, and reproduces the content.

Japanese Patent Application Laid-Open No. 2016-71638 discusses another communication apparatus reproducing a content that, when transmitting a reproduction instruction to reproduce the content by content redirection to a communication apparatus, transmits a reproduction start position of the content together with the reproduction instruction.

If the communication apparatus discussed in Japanese Patent Application Laid-Open No. 2016-71638 receives a reproduction instruction and then performs reproduction preparation for the content and starts reproducing the content, there occurs a time difference between transmission of the reproduction instruction by another communication apparatus and start of reproducing the content by the communication apparatus. More specifically, if another communication apparatus continues reproducing the content even after the transmission of the reproduction instruction, there occurs a difference in reproduction position between the communication apparatus and another communication apparatus as much as the occurred time difference, if the communication apparatus starts to reproduce the content based on the reproduction start position.

SUMMARY OF THE INVENTION

The present disclosure is directed to reducing a difference in reproduction positions between a communication apparatus that is reproducing a content stored in an external apparatus and a communication apparatus different from the foregoing communication apparatus that receives a reproduction instruction for the content from the foregoing communication apparatus and reproduces the content.

According to an aspect of the present disclosure, a communication apparatus a first reception unit configured to receive, in a case where another communication apparatus is reproducing a content stored in an external apparatus, an instruction for causing the communication apparatus to obtain the content from the external apparatus and reproduce the obtained content, information indicating a reproduction position of the content being reproduced by the another communication apparatus, and information indicating a start timing at which the communication apparatus starts to reproduce the content from the another communication apparatus, and a control unit configured to control, in a case where the start timing has come, start of reproducing the content, and in starting reproduction of the content, reproducing of the content from a reproduction position at a subsequent time from the reproduction position based on the start timing.

According to another aspect of the present disclosure, a communication apparatus includes a reproduction unit configured to reproduce a content stored in an external apparatus, an obtaining unit configured to obtain, in a case where the content is being reproduced, a reproduction position of the content, and a first transmission unit configured to transmit, in a case where the content is being reproduced, an instruction for causing the another communication apparatus to obtain the content and reproduce the obtained content, information indicating a start timing at which the another communication apparatus starts to reproduce the content, and information indicating the reproduction position obtained by the obtaining unit to the another communication apparatus.

Further features of the present disclosure will become apparent from the following description of exemplary embodiments with reference to the attached drawings.

BRIEF DESCRIPTION OF THE DRAWINGS

FIG. 6 is a flowchart illustrating processing to be executed by the communication apparatus in performing content redirection with another communication apparatus.

DESCRIPTION OF THE EMBODIMENTS

Exemplary embodiments of the present disclosure will be described in detail below with reference to the accompanying drawings. Configurations described in the following exemplary embodiments are just examples, and the present disclosure is not limited to the illustrated configurations.

Figure 1:
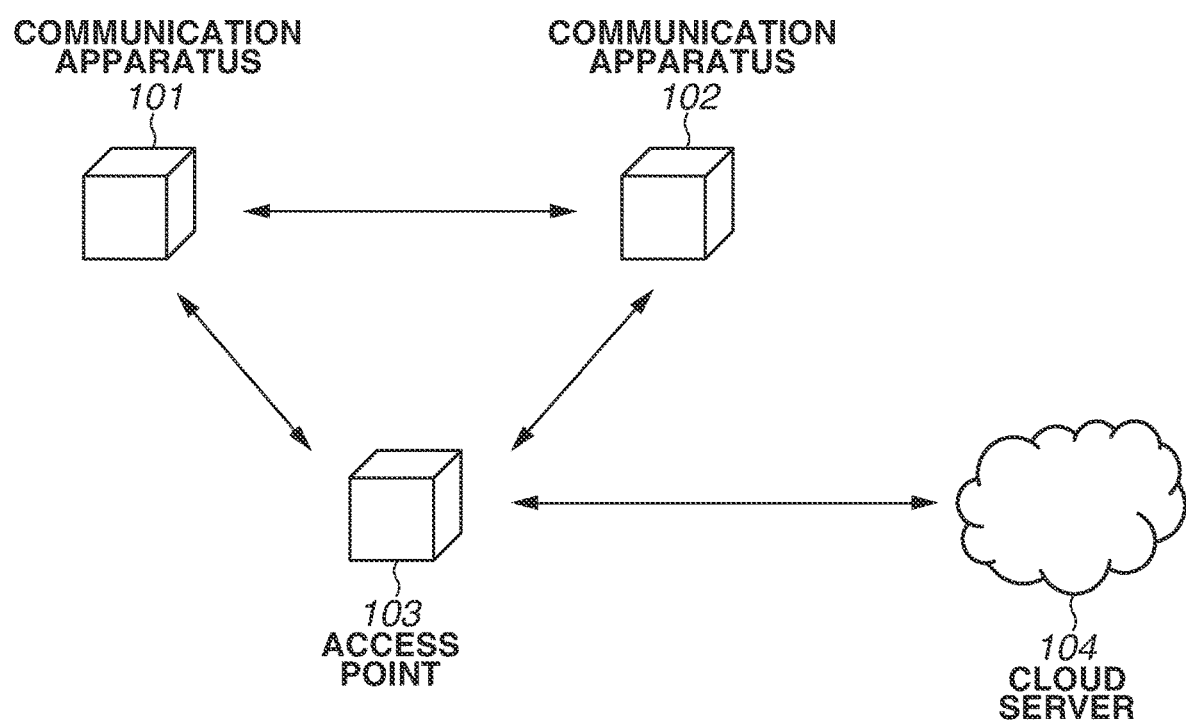
FIG. 1 is a diagram illustrating a network configuration of a communication system in which a communication apparatus participates.

FIG. 1 is a diagram illustrating a network configuration of a communication system in which a communication apparatus 102 according to the present exemplary embodiment participates. A communication apparatus 101 and the communication apparatus 102 can perform wireless communication compliant with the Wi-Fi Direct standard, for example. In such a case, the communication apparatus 101 and 102 directly perform wireless communication without the intermediary of an access point (AP) 103. The communication apparatus 101 and 102 can also perform wireless communication via the AP 103 on an infrastructure network compliant with the Institute of Electrical and Electronics Engineers (IEEE) 802.11 series standard.

The communication apparatus 101 and 102 can each communicate with a cloud server 104 via the AP 103. The communication apparatus 101 and 102 can each obtain a content from the cloud server 104 and reproduce the content. According to the present exemplary embodiment, the content includes any one of image data, audio data, moving image data, and video data. The video data refers to data including both audio data and moving image data. The content may also include at least any one of software data, graphical user interface (GUI) data, and metadata for reproducing the foregoing data.

According to the present exemplary embodiment, the communication apparatus 101 and 102 have a content redirection function. By content redirection, the communication apparatus 101 causes the communication apparatus 102 to obtain a content from an external apparatus other than the communication apparatus 101, and causes the communication apparatus 102 to reproduce the obtained content. An example of the external apparatus is the cloud server 104. Specifically, the communication apparatus 101 and 102 perform wireless communication compliant with the Wi-Fi Direct standard, and the communication apparatus 101 transmits a reproduction instruction to the communication apparatus 102 to cause the communication apparatus 102 to reproduce the content. Alternatively, the communication apparatus 101 and 102 may perform similar processing by performing wireless communication via the infrastructure network.

The reproduction instruction transmitted from the communication apparatus 101 to the communication apparatus 102 includes relevant information about the content. The communication apparatus 102 obtains the content from the external apparatus based on the relevant information about the content, included in the received reproduction instruction, and reproduces the content. Examples of the relevant information about the content include, for example, an identifier for identifying the content, a service name for identifying a service to be used in reproducing the content, and location information (Uniform Resource Identifier (URI) or Uniform Resource Locator (URL)) about the content. The relevant information about the content may be part of such information. The identifier of the content refers to an identifier for uniquely determining the content. The location information about the content refers to information indicating the storage location where the content is stored in the external apparatus. For example, the communication apparatus 101 and 102 perform content redirection compliant with the Wi-Fi Miracast standard.

The communication apparatus 101 and 102 may have a mirroring function in addition to the content redirection function. By mirroring, the communication apparatus 101 (source device) shares at least either one of a screen being displayed and sound being reproduced with the communication apparatus 102 (sink device). Specifically, the communication apparatus 101 transmits a stream of image data and audio data to the communication apparatus 102 as information about the screen being displayed and the sound being reproduced by the communication apparatus 101. The image data is obtained by encoding the screen being displayed by the communication apparatus 101. The audio data is obtained by encoding the sound being reproduced by the communication apparatus 101. Receiving the stream of the image data and the audio data, the communication apparatus 102 reproduces the received data in synchronization with the communication apparatus 101. For example, the communication apparatus 101 and 102 perform mirroring compliant with the Wi-Fi Miracast standard to transmit and receive the stream via wireless communication compliant with the Wi-Fi Direct standard or via the infrastructure network. The communication apparatus 101 can share at least either one of the screen being displayed and the sound being reproduced with the communication apparatus 102. If the communication apparatus 101 does not share sound by mirroring, the communication apparatus 101 does not transmit audio data to the communication apparatus 102. If the communication apparatus 101 does not share a screen by mirroring, the communication apparatus 101 does not transmit image data to the communication apparatus 102.

Specific examples of the communication apparatus 101 include, but not limited to, a tablet, a smartphone, a personal computer (PC), a mobile phone, a camera, and a video camera. Alternatively, the communication apparatus 101 may be any communication apparatus that can cause a different communication apparatus to obtain a content stored in an external apparatus and to reproduce the content by transmitting relevant information about the content to the different communication apparatus.

Specific examples of the communication apparatus 102 include a tablet, a smartphone, a PC, a mobile phone, a television set, a television adapter, a set top box, and a head-mounted display. Other specific examples of the communication apparatus 102 include a projector, a display, and a car navigation apparatus. Such examples are not restrictive. The communication apparatus 102 may be any communication apparatus that can obtain a content from an external apparatus based on relevant information received from the communication apparatus 101, and reproduce the content.

According to the present exemplary embodiment, the communication apparatus 101 and 102 start content redirection when the communication apparatus 101 is reproducing a content, whereby the communication apparatus 102 is caused to reproduce the content having been reproduced by the communication apparatus 101. Here, the communication apparatus 101 transmits a reproduction position of the content and a reproduction start timing to the communication apparatus 102. In starting to reproduce the content being reproduced by the communication apparatus 101, the communication apparatus 102 reproduces the content from a reproduction start position based on the reproduction position and the reproduction start timing transmitted from the communication apparatus 101. The communication apparatus 102 can thereby reduce a difference in the reproduction position of the content, occurring between the communication apparatus 101 and 102. The reproduction start position refers to the reproduction position of the content when the communication apparatus 102 starts reproducing the content.

According to the present exemplary embodiment, the apparatus of FIG. 1 perform wireless communication compliant with the IEEE 802.11 series standard. In addition, the apparatus may use wireless communications compliant with other wireless communication methods such as Bluetooth®, near-field communication (NFC), ultra-wideband (UWB), ZigBee, and MultiBand orthogonal frequency division multiplexing (OFDM) Alliance (MBOA) communication methods. UWB includes Wireless Universal Serial Bus (USB), Wireless 1394, and WiNET. Communication methods compliant with wired communication methods such as a wireless local area network (LAN) may also be used.

According to the present exemplary embodiment, the communication apparatus 101 and 102 use the Wi-Fi Miracast standard as a communication method for mirroring. However, this is not restrictive. Other communication methods such as Intel Wireless Display (WiDi) and Wireless High Definition (WirelessHD) may be used.

The communication apparatus 101 and 102 perform content redirection and mirroring via the network compliant with the Wi-Fi Direct standard or via the infrastructure network. In addition, the communication apparatus 101 and 102 can establish an application service platform (ASP) session via such networks, and perform content redirection and mirroring via the established ASP session.

Figure 2:
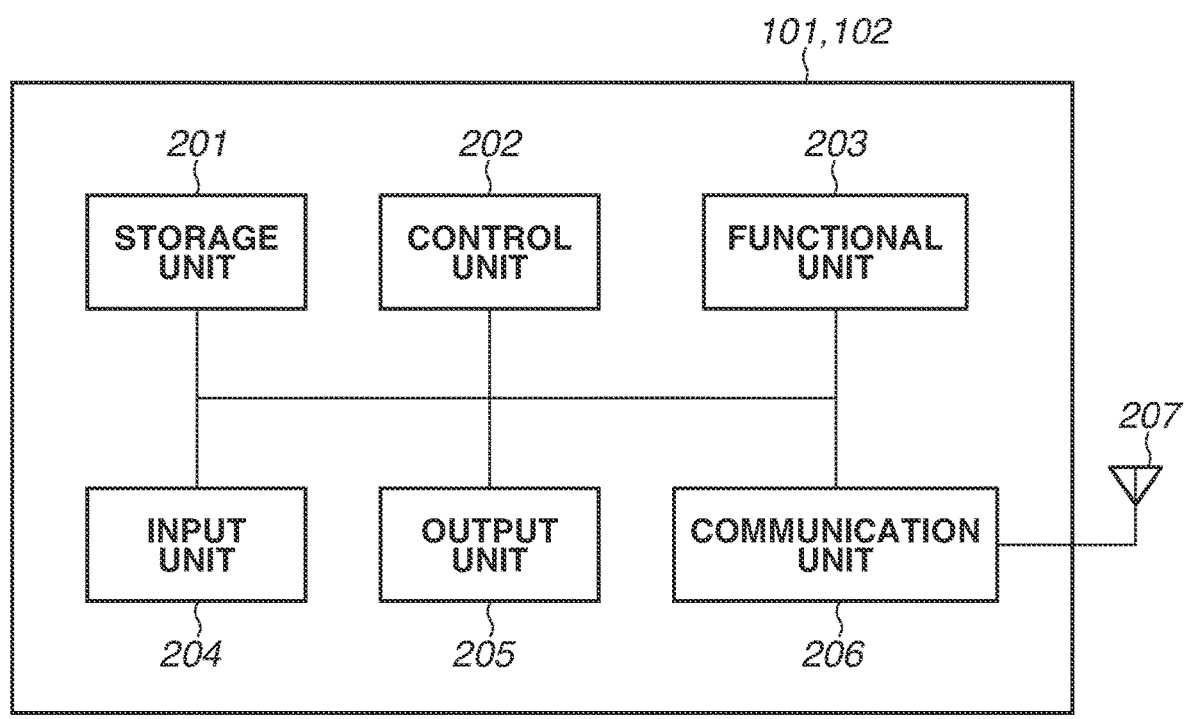
FIG. 2 is a diagram illustrating a hardware configuration of the communication apparatus.

FIG. 2 illustrates a hardware configuration of the communication apparatus 101.

The communication apparatus 101 includes a storage unit 201, a control unit 202, a functional unit 203, an input unit 204, an output unit 205, a communication unit 206, and an antenna 207.

The storage unit 201 includes one or more memories such as a read-only memory (ROM) and a random access memory (RAM). The storage unit 201 stores a computer program for performing various operations to be described below and various types of information, such as a communication parameter for wireless communication. Aside from memories such as a ROM and a RAM, the storage unit 201 may use a storage medium, such as a flexible disk, a hard disk, an optical disc, a magneto-optical disc, a compact disc read-only memory (CD-ROM), a compact disc-recordable (CD-R), a magnetic tape, a nonvolatile memory card, and a digital versatile disc (DVD). The storage unit 201 may include a plurality of memories.

The control unit 202 includes one or more processors such as a central processing unit (CPU) and a microprocessing unit (MPU) which function as a computer. The control unit 202 controls the entire communication apparatus 101 by executing the computer program stored in the storage unit 201. The control unit 202 may control the entire communication apparatus 101 through cooperation of the computer program stored in the storage unit 201 and an operating system (OS). The control unit 202 may include a plurality of processors such as a multicore processor, and the entire communication apparatus 101 may be controlled by the plurality of processors.

The control unit 202 implements a content redirection function as a source device by executing the computer program stored in the storage unit 201. The content redirection function as a source device is a function of transmitting information for a sink device to obtain a content to be reproduced by the sink device from an external apparatus other than the source device to the sink device. As the content redirection function as a source device, the communication apparatus 101 can also transmit reproduction control information for controlling the reproduction of the content being reproduced by the sink device to the sink device. The control unit 202 of the communication apparatus 101 may also implement a mirroring function as a source device by executing the computer program stored in the storage unit 201. The mirroring function as a source device is a function of transmitting image data obtained by capturing and encoding a screen being displayed on the own apparatus and audio data obtained by encoding sound being reproduced to the sink device.

The control unit 202 controls the functional unit 203 to perform predetermined processing such as imaging and content browsing. The functional unit 203 is hardware for the communication apparatus 101 to perform the predetermined processing. For example, if the communication apparatus 101 is a camera, the functional unit 203 is an imaging unit and performs imaging processing.

The input unit 204 accepts various operations from the user. The output unit 205 provides various outputs to the user via a monitor screen and a speaker. The outputs of the output unit 205 may include a display on the monitor screen, an audio output from the speaker, and a vibration output. The monitor screen to which the output unit 205 performs an output refers to that of the communication apparatus 101. Alternatively, the monitor screen may be a monitor screen included in another apparatus connected to the communication apparatus 101. Both the input unit 204 and the output unit 205 may be implemented by a single module like a touch panel. By providing a display on the monitor screen, an audio output from the speaker, and/or a vibration output, the output unit 205 implements a function as a notification unit for making a notification to the user. The input unit 204 and the output unit 205 each may be either integrated with or separate from the communication apparatus 101. For example, the communication apparatus 101 may include hardware keys and/or a touch screen integrated with the communication apparatus 101 as the input unit 204. A remote controller separate from the communication apparatus 101 may be provided as the input unit 204. For example, the communication apparatus 101 may include a monitor screen or light source integrated with the communication apparatus 101 as the output unit 205. A display and a speaker separate from the communication apparatus 101 may be provided as the output unit 205.

The communication unit 206 controls wireless communication compliant with the IEEE 802.11 series, wired communication on a wired LAN, and Internet Protocol (IP) communication. The communication unit 206 transmits and receives wireless signals for wireless communication via the antenna 207. The communication apparatus 101 can also communicate a content such as image data, document data, and video data, with the communication apparatus 102 via the communication unit 206.

The communication apparatus 102 has a similar hardware configuration to that of the communication apparatus 101. Since a storage unit 201, a functional unit 203, an input unit 204, an output unit 205, a communication unit 206, and an antenna 207 of the communication apparatus 102 are similar to those of the communication apparatus 101, a description thereof will be omitted.

A control unit 202 of the communication apparatus 102 implements a content redirection function as a sink device by executing a computer program stored in the storage unit 201. The content redirection function as a sink device is a function of obtaining a content to be reproduced from an external apparatus other than a source device based on information transmitted from the source device and reproducing the content. As the content redirection function as a sink device, the communication apparatus 102 can also control the reproduction of the content on the own apparatus based on reproduction control information received from the source device. The control unit 202 may implement a mirroring function as a sink device by executing the computer program stored in the storage unit 201. The mirroring function as a sink device is a function of receiving image data obtained by capturing and encoding a screen being displayed by the source device and audio data obtained by encoding sound being reproduced, and decoding and reproducing the image data and audio data.

According to the present exemplary embodiment, the communication apparatus 101 and 102 are apparatus capable of both image display and sound reproduction. However, both the communication apparatus 101 and 102 may be apparatus only capable of either one of image display and sound reproduction.

Figure 3:
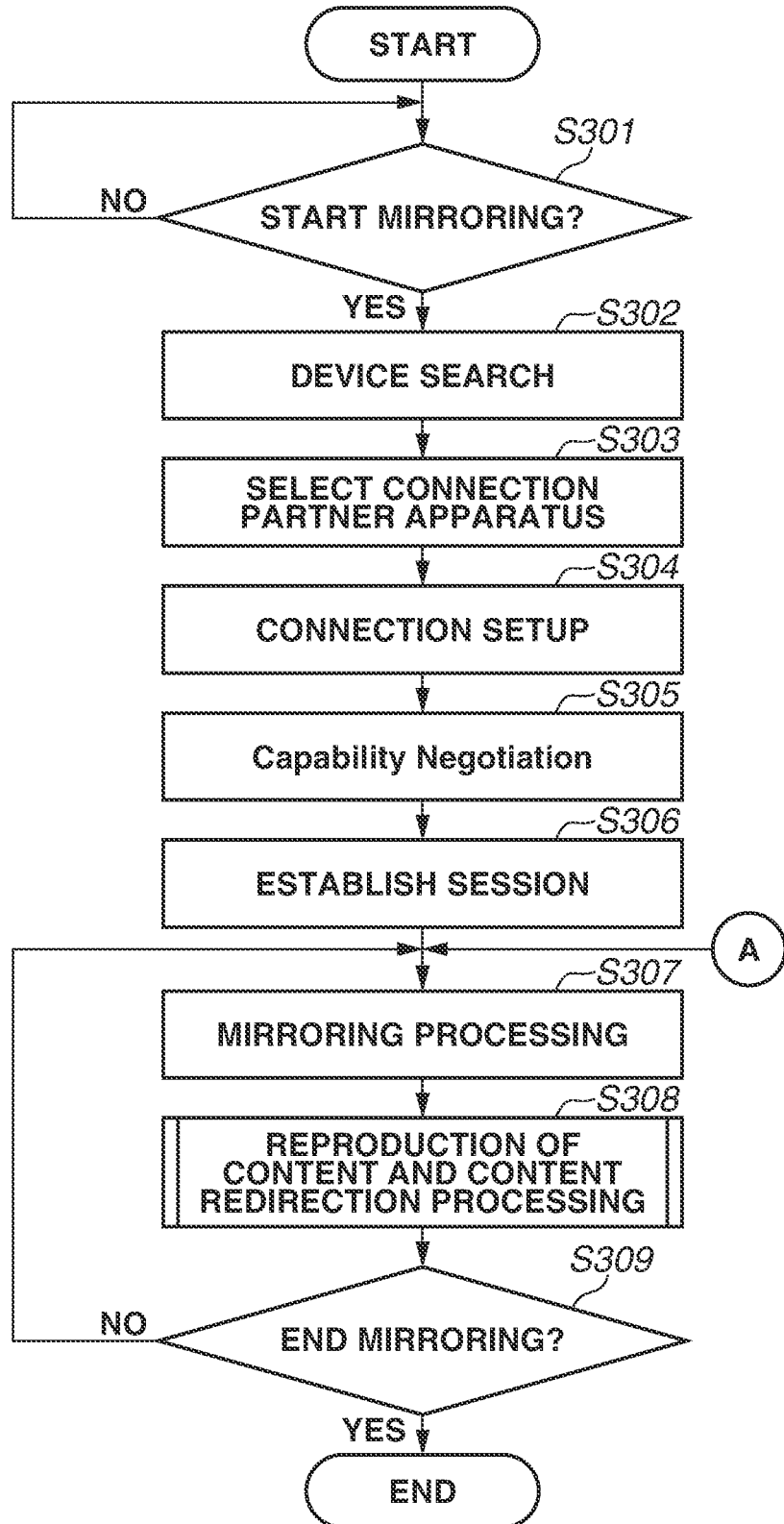
FIG. 3 is a flowchart illustrating processing to be executed by a communication apparatus in performing mirroring with another communication apparatus.
Figure 4:
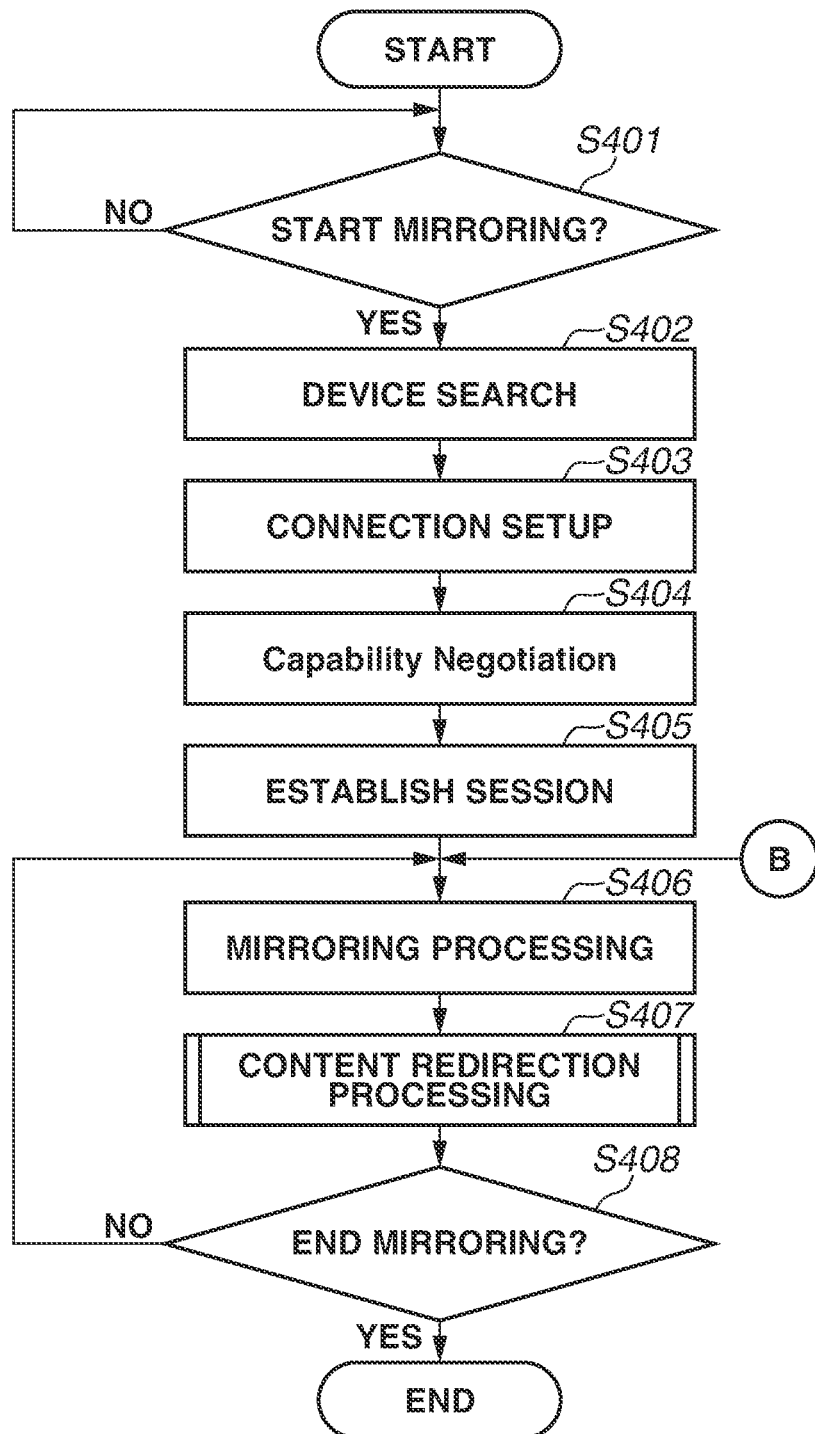
FIG. 4 is a flowchart illustrating processing to be executed by the communication apparatus in performing mirroring with another communication apparatus.

Processing to be executed by the communication apparatus 101 and 102 in performing mirroring will be described with reference to FIGS. 3 and 4, respectively. FIG. 3 is a flowchart illustrating processing implemented by the control unit 202 of the communication apparatus 101 reading the computer program stored in the storage unit 201 and executing the computer program when the communication apparatus 101 performs mirroring with the communication apparatus 102. FIG. 4 is a flowchart illustrating processing implemented by the control unit 202 of the communication apparatus 102 reading the computer program stored in the storage unit 201 and executing the computer program when the communication apparatus 102 performs mirroring with the communication apparatus 101.

Step S301 of FIG. 3 is started by power-on of the communication apparatus 101. However, this is not restrictive. Step S301 may be started in response to activation of a predetermined application on the communication apparatus 101. Step S401 of FIG. 4 is started by power-on of the communication apparatus 102. However, this is not restrictive. Step S401 may be started in response to activation of a predetermined application on the communication apparatus 102.

In step S301, the communication apparatus 101 initially determines whether to start mirroring. The determination is performed based on whether a mirroring start operation is performed by the user via the input unit 204 of the communication apparatus 101. While the mirroring start operation refers to the user's pressing of a control button for starting mirroring, this is not restrictive. In the determination, the communication apparatus 101 may use user operations, such as a predetermined keyboard operation, mouse operation, touch operation, and joystick operation, as the start operation. Alternatively, the communication apparatus 101 may use user operations, such as a predetermined gesture, pressing of a control button on a remote controller, a start of reproduction of a predetermined content, and activation of a predetermined application, as the start operation. If no mirroring start operation is performed, the communication apparatus 101 determines to not start mirroring (NO in step S301) and the processing returns to step S301. Meanwhile, if a mirroring start operation is performed, the communication apparatus 101 determines to start mirroring (YES in step S301) and the processing proceeds to step S302.

The communication apparatus 101 is not limited to the mirroring start operation by the user, and may automatically start mirroring. For example, the communication apparatus 101 may start mirroring based on a lapse of a predetermined time from activation of a predetermined application or a start of reproduction of a predetermined content. The communication apparatus 101 may start mirroring based on recognition of a predetermined image or a predetermined person via the input unit 204.

Similarly, in step S401, the communication apparatus 102 determines whether to start mirroring. The determination of step S401 is performed in a similar manner to that of step S301. If the communication apparatus 102 determines to not start mirroring (NO in step S401), the processing returns to step S401. Meanwhile, if the communication apparatus 102 determines to start mirroring (YES in step S401), the processing proceeds to step S402.

In steps S302 and S402, the communication apparatus 101 and 102 perform a device search therebetween. The communication apparatus 101 and 102 search for a device to perform mirroring with via wireless communication compliant with the Wi-Fi Direct standard or via the infrastructure network.

In the flowchart according to the present exemplary embodiment, the communication apparatus 101 and 102 search for a device to perform mirroring with by the method compliant with the Wi-Fi Direct standard. Specifically, the communication apparatus 101 initially transmits a Probe Request compliant with the IEEE 802.11 series standard as a device discovery request. The communication apparatus 102 transmits a Probe Response as a response. The communication apparatus 101 and 102 thereby discover each other. The apparatus to transmit the Probe Request and Probe Response may be reversed.

The communication apparatus 102 may perform the determination of step S401 based on whether a wireless signal intended for a device search is received from the communication apparatus 101. For example, the communication apparatus 102 may perform a determination of YES in step S401 in response to receipt of the Probe Request as the wireless signal intended for a device search from the communication apparatus 101.

The communication apparatus 101 displays a list of discovered devices on the monitor screen that is the output unit 205. The user selects a device to perform mirroring with from the list of devices displayed on the monitor screen of the communication apparatus 101. In step S303, the communication apparatus 101 selects the user-selected device as a connection partner apparatus to perform mirroring with. In this step, the communication apparatus 101 may select the connection partner apparatus based on a history of devices with which mirroring has been performed in the past. Specifically, if the discovered devices include a device with which mirroring has been performed in the past, the communication apparatus 101 selects the device as the connection partner apparatus. Alternatively, the communication apparatus 101 may select a device at the closest distance to the communication apparatus 101 from among the discovered devices as the connection partner apparatus. The communication apparatus 101 may select a device of the highest communication quality as the connection partner apparatus. The selection of the connection partner apparatus in step S303 may be performed by the communication apparatus 102.

In the flowchart according to the present exemplary embodiment, the Probe Request and Probe Response are used for the device search. However, a Beacon or other wireless signals compliant with the IEEE 802.11 series standard may be used based on the Wi-Fi Miracast standard. The communication apparatus 101 or 102 may perform a device search by using NFC, a Quick Response (QR) code®, or Bluetooth® Low Energy. For example, if the communication apparatus 101 has an NFC communication function, the communication apparatus 101 and 102 can be paired by an NFC touch operation, and the subsequent communication can be performed based on the Wi-Fi Miracast standard.

Before the processing of steps S304 and S403, the communication apparatus 101 and 102 may perform a service search compliant with the Wi-Fi Direct standard. By performing the service search, at least either one of the communication apparatus 101 and 102 can obtain information about a service or services provided by the other apparatus.

In step S304, the communication apparatus 101 performs a connection setup with the connection partner apparatus selected in step S303. According to the present exemplary embodiment, the communication apparatus 102 is selected as the connection partner apparatus in step S303. In step S403, the communication apparatus 102 therefore also performs a connection setup with the communication apparatus 101. Specifically, the communication apparatus 101 and 102 perform Wi-Fi Miracast connection processing, and then perform Transmission Control Protocol (TCP) connection processing. The execution of such connection processing completes the connection setup between communication apparatus 101 and 102.

Now, detailed procedures of steps S304 and S403 will be described. To determine a communication apparatus that serves as a group owner (GO) in charge of establishing a network in wireless communication compliant with the Wi-Fi Direct standard, the communication apparatus 101 transmits a GO Negotiation Request to the communication apparatus 102. This signal includes an Intent value indicating the degree of intention of the communication apparatus 101 to be a GO. A communication apparatus that has determined to not serve as a GO serves as a client (CL) and plays the role of participating in the network constructed by the GO.

Receiving the GO Negotiation Request, the communication apparatus 102 transmits a GO Negotiation Response including the Intent value of the communication apparatus 102 as a response. Receiving the GO Negotiation Response, the communication apparatus 101 compares the Intent values of the communication apparatus 101 and 102, and determines the communication apparatus having the greater Intent value as a GO. The communication apparatus having the smaller Intent value is determined as a CL.

The communication apparatus 101 transmits a GO Negotiation Confirm including the result of comparison of the Intent values to the communication apparatus 102. According to the present exemplary embodiment, the communication apparatus 101 has an Intent value greater than that of the communication apparatus 102, and the communication apparatus 101 serves as a GO and the communication apparatus 102 serves as a CL.

The communication apparatus 101 and 102 then share parameter information for establishing a network connection therebetween, including connection- and security-related information, by using a Wi-Fi Protected Setup (WPS) method. Based on the exchanged parameter information, the communication apparatus 102 serving as a CL then transmits an Association Request to the communication apparatus 101 serving as a GO. Receiving this signal, the communication apparatus 101 transmits an Association Response as a response.

In such a manner, the communication apparatus 101 and 102 complete the Wi-Fi Miracast connection processing compliant with the Wi-Fi Direct standard therebetween. While, according to the present exemplary embodiment, the communication apparatus 101 is the GO and the communication apparatus 102 is the CL, the roles may be reversed. The wireless signals transmitted by the GO may be transmitted by the CL instead. In such a case, the wireless signals transmitted by the CL are transmitted by the GO instead. In performing the Wi-Fi Miracast connection processing, the communication apparatus 101 and 102 may use a Beacon message and a Reassociation message aside from the foregoing wireless signals. The communication apparatus 101 and 102 may also use a Peer-to-peer (P2P) Invitation message and a Provision Discovery message.

The communication apparatus 101 and 102 then establish a TCP connection therebetween. The TCP connection is established by performing a three-way handshake while the communication apparatus 101 serves as a TCP server and the communication apparatus 102 serves as a TCP client.

In such a manner, the communication apparatus 101 and 102 complete the Wi-Fi Miracast connection processing and establish a TCP connection therebetween, whereby the connection setup is completed.

If the communication apparatus 101 and 102 search for a device to perform mirroring with via an infrastructure network, the processing of steps S302 to S304 and S402 to S403 is performed in the following manner.

A search for a device to perform mirroring with via an infrastructure network is performed by using a multicast domain name system (DNS) (mDNS). The communication apparatus 101 initially multicasts a DNS packet to other communication apparatus participating in the infrastructure network via the connected AP 103. The communication apparatus 101 detects a mirroring-capable device by receiving a response from the device via the AP 103. Specifically, the communication apparatus 101 transmits a DNS packet including a DNS record via the AP 103. The DNS record indicates that the communication apparatus 101 is searching specifically for a communication apparatus capable of wireless communication compliant with the Wi-Fi Miracast standard. The DNS record includes either one of identifiers displaysrc and display, which indicate a source device and a sink device, respectively. Since the communication apparatus 101 searches for a sink device as a device to perform mirroring with, the DNS record includes the identifier display indicating a sink device. The communication apparatus 101 can transmit the DNS packet at arbitrary transmission intervals for an arbitrary number of times of transmission. In performing a device search, the communication apparatus 101 repeats the transmission of the DNS packet up to a predetermined number of times. Alternatively, the communication apparatus 101 may repeat the transmission of the DNS packet until a predetermined time elapses. The communication apparatus 101 may stop transmitting the DNS packet in response to receipt of responses from a predetermined number of other communication apparatus.

After the search for a device to perform mirroring with via the infrastructure network, the communication apparatus 101 displays the search results and selects a connection partner apparatus. The display of the search results and the selection of the connection partner apparatus are performed in the same manner as in step S303.

The communication apparatus 101 then transmits an mDNS inquiry to the selected connection partner apparatus (here, the communication apparatus 102) via the AP 103. The mDNS inquiry transmitted here is a signal for inquiring capability information about the communication apparatus 102 and a port number and a hostname to be used for communication between the communication apparatus 101 and 102. The capability information about the communication apparatus 102, inquired by the mDNS inquiry is information about whether the communication apparatus 102 is a sink device, a source device, or a dual-role device. Receiving the mDNS inquiry, the communication apparatus 102 transmits an mDNS response including the capability information about the own apparatus, the port number, and the hostname to the communication apparatus 101. Receiving the mDNS response, the communication apparatus 101 performs a three-way handshake with the communication apparatus 102 to establish a TCP connection, and completes the connection setup with the communication apparatus 102.

Whether mirroring is performed via the network compliant with the Wi-Fi Direct standard or via the infrastructure network, the processing after the completion of the connection setup between the communication apparatus 101 and 102 is the same.

In steps S305 and S404, the communication apparatus 101 and 102 performs capability negotiation. In the Wi-Fi Miracast standard, the Real Time Streaming Protocol (RTSP) is defined to be used for capability negotiation. The RTSP is a protocol for streaming control. The TCP is typically used as a lower-layer transport protocol. For capability negotiation, the communication apparatus 101 and 102 exchange predetermined messages RTSP M1 to M4. The communication apparatus 101 obtains the capability information about the communication apparatus 102 by the exchange of the RTSP messages, determines parameters to be used, and notifies the communication apparatus 102 of the parameters. The communication apparatus 102 sets the parameters notified by the communication apparatus 101. Specific examples of screen-related capability information include information about screen resolutions and frame rates supported by the communication apparatus 102. Specific examples of audio-related capability information include information about codecs and sampling frequencies supported by the communication apparatus 102. As a result of the capability negotiation, the types of image and audio coding schemes, the video resolution, and the frame rate to be used when the communication apparatus 101 and 102 perform mirroring therebetween are determined. The capability information transmitted and received between the communication apparatus 101 and 102 may be part of such information.

In steps S306 and S405, after the completion of the capability negotiation, the communication apparatus 101 and 102 establish a session compliant with the Wi-Fi Miracast standard. To establish the session, the communication apparatus 101 and 102 exchange predetermined messages RTSP M5 to M7 according to the Wi-Fi Miracast standard. The port number to be used between the communication apparatus 101 and 102 is set and the session is established by the exchange of such RTSP messages.

In step S307, after the establishment of the session, the communication apparatus 101 starts mirroring processing as a source device. In this step, as the mirroring processing that is performed by a source device, the communication apparatus 101 captures the screen being displayed and performs encoding, multiplexing, and data transmission processing of the captured image. The communication apparatus 101 may perform encoding, multiplexing, and data transmission processing of sound being reproduced in addition to or instead of those of the captured image of the screen. The mirroring processing to be performed by the communication apparatus 101 may be part of such processing.

In step S406, the communication apparatus 102 starts mirroring processing as a sink device. In this step, as the mirroring processing that is performed by a sink device, the communication apparatus 102 performs data reception, demultiplexing, decoding of the captured image, and processing for reproducing the decoded captured image. If the communication apparatus 101 performs the mirroring processing of the sound being reproduced in addition to or instead of that of the captured image, the communication apparatus 102 may perform data reception, demultiplexing, and decoding of the audio data transmitted from the communication apparatus 101, and processing for reproducing the decoded audio data. The mirroring processing to be performed by the communication apparatus 102 may be part of such processing.

By the communication apparatus 101 and 102 performing the processing of steps S307 and S406, a stream of information about at least either one of the screen being displayed and the sound being reproduced by the communication apparatus 101 is transmitted to the communication apparatus 102. The communication apparatus 102 reproduces the transmitted stream of the information about the screen and/or sound, and thereby at least either displays the same screen or reproduces the same sound as the communication apparatus 101 does.

In step S308, the communication apparatus 101 performs the reproduction of content and content redirection processing. In step S407, the communication apparatus 102 performs content redirection processing. Details of the processing of steps S308 and S407 will be described below with reference to FIGS. 5 and 6, respectively.

After steps S308 and S407, the processing proceeds to steps S309 and S408, respectively. In steps S309 and S408, the communication apparatus 101 and 102 determine whether to end mirroring. If the communication apparatus 101 and 102 determine to not end mirroring (NO in step S309 and NO in step S408), the processing proceeds to steps S307 and S406, respectively. In steps S307 and S406, the communication apparatus 101 and 102 perform the mirroring processing. Meanwhile, if the communication apparatus 101 and 102 determine to end mirroring (YES in step S309 and YES in step S408), the processing of the flowcharts ends.

In FIG. 3, the communication apparatus 101 performs the processing of step S308 before performing the determination of step S309. However, this is not restrictive. The communication apparatus 101 may perform the determination of step S309 at any time after the mirroring processing is started in step S307. Similarly, in FIG. 4, the communication apparatus 102 performs the processing of step S407 before performing the determination of step S408. However, this is not restrictive. The communication apparatus 102 may perform the processing of step S408 at any time after the mirroring processing is started in step S406.

As described above, FIGS. 3 and 4 illustrate the processing to be executed by the communication apparatus 101 and 102, respectively, when the communication apparatus 101 and 102 perform mirroring.

Next, details of the processing of steps S308 and S407 will be described with reference to FIGS. 5 and 6, respectively.

Figure 5:
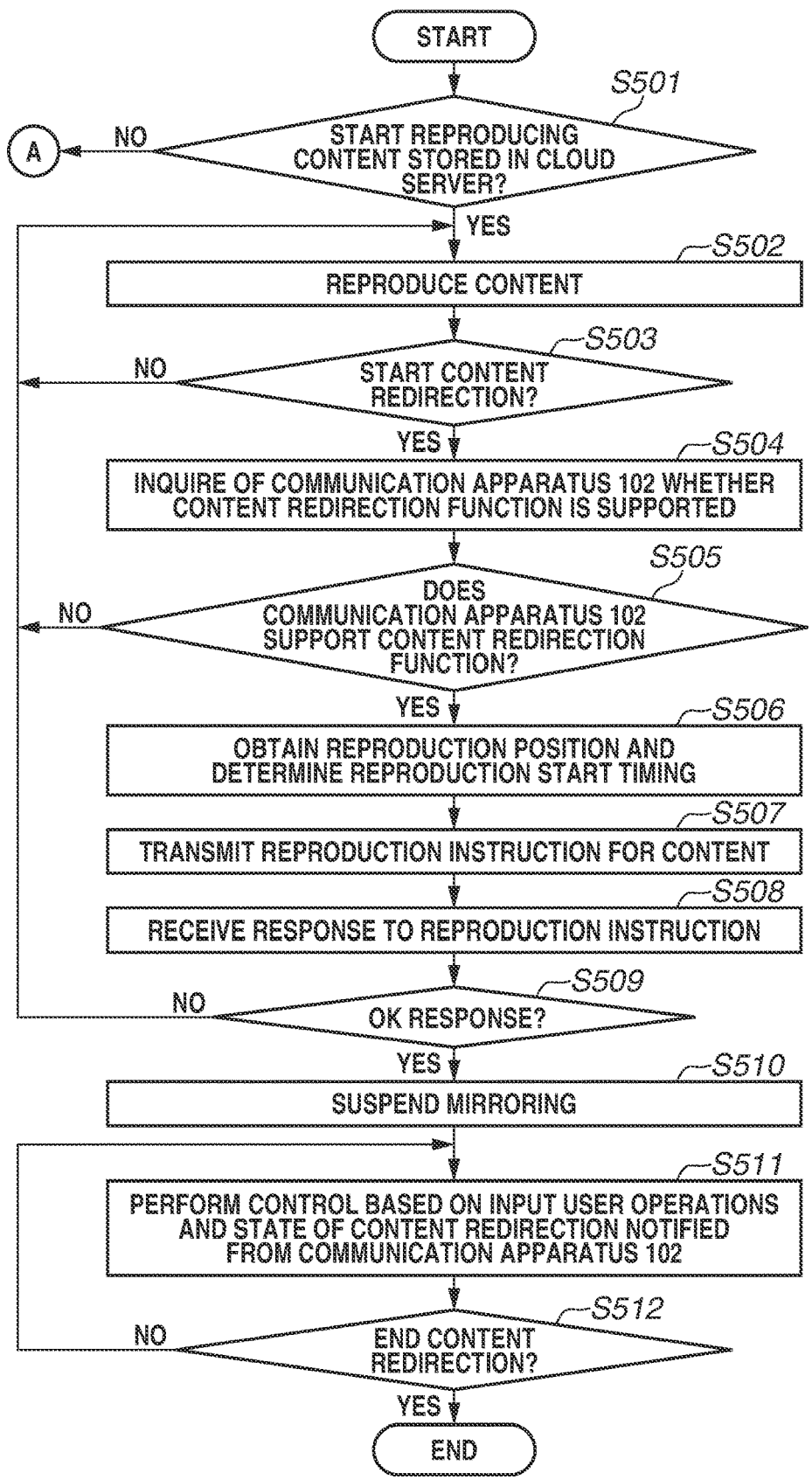
FIG. 5 is a flowchart illustrating processing to be executed by the communication apparatus in performing content redirection with another communication apparatus.

In step S501 of FIG. 5, the communication apparatus 101 determines whether to start reproducing a content stored in the cloud server 104. The determination is performed based on whether the user issues a reproduction instruction for the content stored in the cloud server 104. For example, the determination can be performed based on whether the user selects a thumbnail or icon of or a hyperlink to the content displayed on the screen of the communication apparatus 101. If the user issues a reproduction instruction for the content, the communication apparatus 101 determines to start reproducing the content (YES in step S501) and the processing proceeds to step S502. If the communication apparatus 101 automatically starts to reproduce a content on the cloud server 104, such as when a predetermined webpage is displayed and when a webpage is scrolled to a predetermined position, the communication apparatus 101 may perform a determination of YES in step S501. Meanwhile, if the user does not issue a reproduction instruction for the content, the communication apparatus 101 determines to not start reproducing a content (NO in step S501) and the processing proceeds to step S307 of FIG. 3.

If the communication apparatus 101 determines to start reproducing the content stored in the cloud server 104 (YES in step S501), the processing proceeds to step S502. In step S502, the communication apparatus 101 obtains the content from the cloud server 104 and reproduces the content. While obtaining the content from the cloud server 104 and reproducing the content, the communication apparatus 101 captures and encodes the image and/or sound output to the output unit 205, and transmits the resulting image data and/or audio data to the communication apparatus 102. The communication apparatus 101 thereby continues the streaming based on at least either one of the screen and sound by mirroring.

In step S503, the communication apparatus 101 determines whether to start content redirection. The determination is performed based on whether the user issues a start instruction for content redirection. For example, the determination may be performed based on whether the user selects a software key for issuing an instruction to start content redirection, displayed on the screen of the communication apparatus 101. If the user does not issue a start instruction for content redirection, the communication apparatus 101 determines to not start content redirection (NO in step S503) and the processing returns to step S502. Meanwhile, if the user issues a start instruction for content redirection, the communication apparatus 101 determines to start content redirection (YES in step S503) and the processing proceeds to step S504.

The communication apparatus 101 may automatically start content redirection based on the processing load of the own apparatus and the status of wireless communication with the communication apparatus 102. For example, the communication apparatus 101 may measure the use rate of the control unit 202 in a predetermined period, and if an average use rate is higher than or equal to a predetermined value, start content redirection since the processing load of the own apparatus is high. For example, the communication apparatus 101 may measure the amount of data transmitted and received by the wireless communication with the communication apparatus 102 in a predetermined period, and if an average amount is greater than or equal to a predetermined value, start content redirection. For example, the communication apparatus 101 may start content redirection if the field intensity of the wireless communication with the communication apparatus 102 is lower than a predetermined value.

If the communication apparatus 101 determines to start content redirection (YES in step S503), the processing proceeds to step S504. In step S504, the communication apparatus 101 inquires of the communication apparatus 102 that is the sink device whether the communication apparatus 102 supports the content redirection function. The communication apparatus 101 can use a RTSP GET_PARAMETER message for the inquiry about the content redirection function.

Meanwhile, in step S601 of FIG. 6, the communication apparatus 102 also determines whether to start content redirection. The determination is performed based on whether the inquiry about the content redirection function is received from the communication apparatus 101. If the inquiry about the content redirection function is not received from the communication apparatus 101, the communication apparatus 102 determines to not start content redirection (NO in step S601) and the processing proceeds to step S406 of FIG. 4. Meanwhile, if the inquiry about the content redirection function is received from the communication apparatus 101, the communication apparatus 102 determines to start content redirection (YES in step S601) and the processing proceeds to step S602.

In step S602, the communication apparatus 102 notifies the communication apparatus 101 of the support status of the content redirection function as a response to the received inquiry about the content redirection function. Specifically, the communication apparatus 102 notifies the communication apparatus 101 whether the content redirection function is supported. In addition to or instead of the information that the content redirection function is supported, the communication apparatus 102 may notify the communication apparatus 101 of information about a service that the communication apparatus 102 can use in reproducing a content by the content redirection function. Specifically, the communication apparatus 102 may notify the communication apparatus 101 of information such as a service name for identifying the service.

In step S505, the communication apparatus 101 determines whether the communication apparatus 102 supports the content redirection function based on the response transmitted from the communication apparatus 102 in step S602. If the communication apparatus 101 determines that the communication apparatus 102 does not support the content redirection function (NO in step S505), the processing returns to step S502. In such a case, at least either one of the communication apparatus 101 and 102 may notify the user that the communication apparatus 102 does not support the content redirection function.

Meanwhile, if the communication apparatus 101 determines that the communication apparatus 102 supports the content redirection function (YES in step S505), the processing proceeds to step S506. In step S506, the communication apparatus 101 obtains the reproduction position of the content and determines a reproduction start timing. Specifically, the communication apparatus 101 obtains the current reproduction position of the content being reproduced by the own apparatus, and sets the obtained reproduction position as the reproduction position to be transmitted in step S507 to be described below. The reproduction position of the content is relative time information with the beginning of the content as a starting point (0.0 sec). The communication apparatus 101 further determines the reproduction start timing of the content. The reproduction start timing is information indicating a timing at which the communication apparatus 102 starts to reproduce the content obtained from the cloud server 104. This information indicates a time period from when the communication apparatus 102 receives the reproduction start timing until when the communication apparatus 102 starts to reproduce the content. The reproduction start timing may be information indicating the time period from when the communication apparatus 102 receives the reproduction instruction or reproduction position until when the communication apparatus 102 starts to reproduce the content. The reproduction start timing may be information indicating a specific time after the transmission of the reproduction start timing by the communication apparatus 101. The communication apparatus 101 determines the reproduction start timing in such a manner that the communication apparatus 102 can start to reproduce the content at the reproduction start timing, by taking into account the time that the communication apparatus 102 takes in performing reproduction preparation for the content to be described below. Specifically, the reproduction start timing is preset in the communication apparatus 101 or an application that the communication apparatus 101 uses when performing content redirection. Alternatively, when the communication apparatus 102 notifies the communication apparatus 101 of the support status of content redirection in step S602, the communication apparatus 102 may notify the communication apparatus 101 of the reproduction start timing appropriate for the communication apparatus 102. In such a case, the communication apparatus 101 determines the reproduction start timing in this step based on the reproduction start timing notified from the communication apparatus 102. The communication apparatus 101 may obtain information about the time that the communication apparatus 102 takes in performing reproduction preparation for the content from the communication apparatus 102 in advance before the determination of the reproduction start timing, and then determine the reproduction start timing based on the information. By determining the reproduction start timing based on the information obtained from the communication apparatus 102, the communication apparatus 101 can determine the reproduction start timing in such a manner that the communication apparatus 102 can start to reproduce the content at the reproduction start timing without fail.

If the reproduction start timing indicates a specific time, the communication apparatus 101 and 102 may synchronize their times in advance before starting to reproduce the content. This can further reduce a difference in the reproduction positions between the communication apparatus 101 and 102 when the communication apparatus 102 starts content redirection. The communication apparatus 101 and 102 can synchronize their times with each other by using a communication method involving time synchronization, such as a communication method according to the IEEE 802.1AS standard. Alternatively, the times of the communication apparatus 101 and 102 may be synchronized by the communication apparatus 101 and 102 each synchronizing their time with that of a server on a network by using a protocol such as the Network Time Protocol (NTP).

In step S507, after the obtaining of the reproduction position and the determination of the reproduction start timing, the communication apparatus 101 transmits a reproduction instruction for a content to the communication apparatus 102. The content that the communication apparatus 102 is instructed to reproduce in this step is the same as the content being reproduced by the communication apparatus 101 at the time of this step. To transmit the reproduction instruction, the communication apparatus 101 may use an RTSP SET_PARAMETER message.

The reproduction instruction transmitted to the communication apparatus 102 in step S507 includes relevant information about the content. Examples of the relevant information about the content include an identifier for identifying the content stored in the cloud server 104, a service name for identifying the service to be used to reproduce the content, and location information (URL or URI) about the content. The relevant information about the content to be transmitted by the communication apparatus 101 may be part of such information.

The reproduction instruction to be transmitted in step S507 and the reproduction position obtained and the reproduction start timing determined in step S506 are included in the same massage. In step S507, the communication apparatus 101 transmits the message including the reproduction instruction, the reproduction position, and the reproduction start timing to the communication apparatus 102.

In step S604, the communication apparatus 102 performs reproduction preparation for the content based on the received reproduction instruction. Specifically, as the reproduction preparation for the content, for example, the communication apparatus 102 performs processing, such as activation of an application, initialization of an image decoder and an audio decoder, login authentication on the website or service providing the content, and downloading of the content. Based on the received relevant information about the content, the communication apparatus 102 may check the website or service providing the content to see whether the content are available.

In step S605, after the reproduction preparation for the content, the communication apparatus 102 determines whether the reproduction start timing for the content has come. Specifically, the communication apparatus 102 performs the determination based on whether time as much as or more than indicated by the reproduction start timing has elapsed since the reproduction start timing is received with the reproduction instruction in step S603. Alternatively, if the reproduction start timing indicates a specific time, the communication apparatus 102 performs the determination based on whether the time indicated by the reproduction start timing has elapsed. If time as much as or more than indicated by the reproduction start timing has elapsed since the receipt of the reproduction start timing or if the specific time indicated by the reproduction start timing has elapsed, the communication apparatus 102 performs a determination of YES in step S605. Meanwhile, if time as much as or more than indicated by the reproduction start timing has not elapsed since the receipt of the reproduction start timing or if the specific time indicated by the reproduction start timing has not elapsed, the communication apparatus 102 performs a determination of NO in step S605. If the communication apparatus 102 determines that the reproduction start timing of the content has not come (NO in step S605), the processing returns to step S605.

Meanwhile, if the communication apparatus 102 determines that the reproduction start timing of the content has come (YES in step S605), the processing proceeds to step S606. In step S606, the communication apparatus 102 transmits a response, such as a completion or error of the reproduction preparation to the communication apparatus 101 as a response to the reproduction instruction for the content. The response here is transmitted, for example, by using an RTSP response message such as an RTSP OK and an RTSP NG that are responses to the received RTSP SET_PARAMETER message. The type of response to be transmitted by the communication apparatus 102 in step S606 is determined based on the result of the reproduction preparation for the content in step S604. If no error occurs during the reproduction preparation for the content in step S604, the communication apparatus 102 transmits an RTSP OK as the response. Meanwhile, if, for example, the application fails to be activated, the image decoder or the audio decoder fails to be initialized, or the login authentication on the website or service providing the content fails, then the communication apparatus 102 transmits an RTSP NG as the response. If the communication apparatus 102 checks the website or service providing the content to see whether the content is available and the content is found to be not available, the communication apparatus 102 transmits an RTSP NG as the response. If the communication apparatus 102 transmits an RTSP NG as the response, the communication apparatus 102 may transmit a message including the reason for the RTSP NG to the communication apparatus 101. If the communication apparatus 102 transmits an RTSP NG as the response, the communication apparatus 102 may transmit the response to the communication apparatus 101 before the reproduction start timing comes.

In step S508, the communication apparatus 101 receives the response to the reproduction instruction for the content from the communication apparatus 102.

In steps S509 and S607, the communication apparatus 101 and 102 each determine whether the response transmitted by the communication apparatus 102 in step S606 is one indicating OK (OK response). If the message transmitted by the communication apparatus 102 as a response to the reproduction instruction for the content is not an OK response (NO in step S509 and NO in step S607), the processing proceeds to step S502 and step S406 of FIG. 4, respectively.

Meanwhile, if the communication apparatus 101 determines that the message transmitted by the communication apparatus 102 as a response to the reproduction instruction for the content is an OK response (YES in step S509), the processing proceeds to step S510. In step S510, the communication apparatus 101 suspends the screen sharing by mirroring that has been continued so far. Similarly, if the communication apparatus 102 determines that the response to the reproduction instruction for the content is an OK response (YES in step S607), the processing proceeds to step S608. In step S608, the communication apparatus 102 suspends the screen sharing by mirroring. Here, the communication apparatus 101 can stop the obtaining of the content from the cloud server 104 and the reproduction of the content as well. Specifically, the communication apparatus 102 initially transmits a stop instruction to suspend mirroring to the communication apparatus 101. Receiving the stop instruction, the communication apparatus 101 suspends the mirroring and transmits a response to the stop instruction to the communication apparatus 102. The communication apparatus 102 may suspend the mirroring when transmitting the stop instruction to the communication apparatus 101. The communication apparatus 102 may suspend the mirroring when the response to the stop instruction is received from the communication apparatus 101. The communication apparatus 102 may transmit an RTSP PAUSE message as the stop instruction. The communication apparatus 101 may transmit a stop instruction instead of the communication apparatus 102. The communication apparatus 101 may transmit a predetermined message to cause the communication apparatus 102 to transmit a stop instruction. The communication apparatus 102 may suspend the mirroring based on the fact that the reproduction preparation for the content is performed in step S604. In such a case, the communication apparatus 101 may suspend the mirroring based on the receipt of the response to the reproduction instruction from the communication apparatus 102. Suspending the mirroring processing between the communication apparatus 101 and 102 can reduce the processing load of the mirroring and suppress the power consumption.

In step S609, after the suspension of the mirroring, the communication apparatus 102 obtains the content from the cloud server 104. Here, the communication apparatus 102 can obtain only a portion of the content by obtaining the content based on the reproduction position and the reproduction start timing received with the reproduction instruction. Specifically, the communication apparatus 102 can obtain only a needed portion of the content by obtaining only the content at and after the reproduction position, taking into account the reproduction position and the reproduction start timing received. Alternatively, in this step, the communication apparatus 102 may obtain the content based only on the received reproduction position.

In step S610, the communication apparatus 102 starts to reproduce the content at a reproduction start position based on the reproduction position and the reproduction start timing received. If the reproduction start timing indicates the time period from when the communication apparatus 102 receives the reproduction start timing until when the communication apparatus 102 starts to reproduce the content, the communication apparatus 102 sets, for example, "the reproduction position+the time indicated by the reproduction start timing" as the reproduction start position, and reproduces the content from the reproduction start position. For example, if the reproduction position received from the communication apparatus 101 indicates 2 minutes 10 seconds and the time indicated by the reproduction start timing is 30 seconds, the communication apparatus 102 reproduces the content from 2 minutes 40 seconds. If the reproduction start timing indicates a specific time, the communication apparatus 102 stores the time of receipt of the reproduction position in advance. Then, the communication apparatus 102 sets, for example, "the reproduction position+(the specific time−the time of receipt of the reproduction position)" as the reproduction start position, and starts reproducing the content. For example, suppose that the reproduction position indicates 2 minutes 10 seconds, the time of receipt of the reproduction start timing is three fifty, and the specific time indicated by the reproduction start timing is three fifty-one. In such a case, the communication apparatus 102 sets 3 minutes 10 seconds as the reproduction start time.

In step S511, the communication apparatus 101 performs control based on input user operations and the state of content redirection notified from the communication apparatus 102. Similarly, in step S611, the communication apparatus 102 performs control based on the state of content redirection and the reproduction control information transmitted from the communication apparatus 101.

Specifically, during content redirection, the communication apparatus 101 transmits reproduction control information based on the input user operations to the communication apparatus 102. The communication apparatus 102 controls the reproduction of the content based on the received reproduction control information. For example, if the communication apparatus 102 is reproducing a content when the user inputs a user operation for issuing a suspension instruction to the communication apparatus 101, the communication apparatus 101 transmits reproduction control information for suspending the reproduction of the content to the communication apparatus 102. Receiving the reproduction control information, the communication apparatus 102 suspends the reproduction of the content. If the communication apparatus 101 and 102 are performing content redirection, the user can thus control the reproduction of the content being reproduced on the communication apparatus 102 by using the communication apparatus 101 as a remote controller.

Aside from suspension (pause), the communication apparatus 101 may transmit reproduction control information including instructions for playback, stop, fast forward, rewind, and playback from a user-specified reproduction start position. The communication apparatus 101 may also transmit reproduction control information including instructions to start the reproduction of the next content, control volume level, control reproduction speed, control the presence or absence of subtitles, and change a language setting. The communication apparatus 101 can transmit reproduction control information including at least any one of the foregoing instructions.

When the communication apparatus 101 and 102 are performing content redirection, the communication apparatus 102 notifies the communication apparatus 101 of the state of content redirection in the communication apparatus 102. As the state of content redirection, the communication apparatus 102 notifies the communication apparatus 101 of a reproduction state and obtaining state of the content, and an execution state of content redirection. The communication apparatus 101 performs control based on the state of content redirection notified from the communication apparatus 102. For example, in a case where the communication apparatus 102 notifies the communication apparatus 101 that the content has been reproduced up to the end as the reproduction state of the content, the communication apparatus 101 may transmit a reproduction instruction to reproduce a different content to the communication apparatus 102, or may end the content redirection. Similarly, the communication apparatus 102 performs control based on the state of content redirection in the own apparatus.

In step S512, the communication apparatus 101 determines whether to end the content redirection. If the user inputs a user operation indicating an end of content redirection, the communication apparatus 101 determines to end the content redirection (YES in step S512). Alternatively, the communication apparatus 101 may determine to end the content redirection, for example, based on the fact that the state of content redirection received from the communication apparatus 102 indicates a stop or an error. Meanwhile, if the user does not input a user operation indicating an end of content redirection, the communication apparatus 101 determines to not end the content redirection (NO in step S512). The communication apparatus 101 may determine to not end the content redirection based on the fact that the state of content redirection received from the communication apparatus 102 does not indicate a predetermined state.

If the communication apparatus 101 determines to not end the content redirection (NO in step S512), the processing returns to step S511. Meanwhile, if the communication apparatus 101 determines to end the content redirection (YES in step S512), the processing of the present flowchart ends.

In step S612, the communication apparatus 102 also determines whether to end the content redirection. If the user inputs a user operation indicating an end of the content redirection, the communication apparatus 102 determines to end the content redirection (YES in step S612). Alternatively, the communication apparatus 102 may determine to end the content redirection based on the fact that the state of content redirection indicates a predetermined state. The communication apparatus 102 may determine to end the content redirection based on the fact that the reproduction control information received from the communication apparatus 101 indicates an end of content redirection. Meanwhile, if the user does not input a user operation indicating an end of content redirection, the communication apparatus 102 determines to not end the content redirection (NO in step S612). Alternatively, the communication apparatus 102 may determine to not end the content redirection based on the fact that the state of content redirection does not indicate a predetermined state. The communication apparatus 102 may determine to not end the content redirection based on the fact that the reproduction control information received from the communication apparatus 101 does not indicate an end of content redirection.

If the communication apparatus 102 determines to not end the content redirection (NO in step S612), the processing returns to step S611. Meanwhile, if the communication apparatus 102 determines to end the content redirection (YES in step S612), the processing of the present flowchart ends.

As described above, the flowcharts of FIGS. 5 and 6 illustrate the processing to be executed by the communication apparatus 101 and 102 in performing content redirection. When starting content redirection, the communication apparatus 102 starts to reproduce the content at the reproduction start position based on the reproduction position and the reproduction start timing received from the communication apparatus 101. This can reduce a difference in the reproduction positions between communication apparatus 101 and 102.

In FIG. 6, the communication apparatus 102 obtains the content from the cloud server 104 in step S609. However, this is not restrictive. The communication apparatus 102 may perform the content obtaining as a part of the reproduction preparation in step S604.

In FIG. 6, if the reproduction start timing comes before the communication apparatus 102 completes the reproduction preparation in step S604, the communication apparatus 102 completes the reproduction preparation before performing the processing of step S606. In such a case, the communication apparatus 102 may notify the communication apparatus 101 that the reproduction preparation is not completed before the reproduction start timing comes. The communication apparatus 101, when transmitting the reproduction start timing to the communication apparatus 102 next time, can determine the reproduction start timing by taking into consideration of the fact that the reproduction preparation has not been completed by the reproduction start timing.

According to the present exemplary embodiment, the communication apparatus 102 is described to determine the reproduction start position based on the reproduction position and the received reproduction start timing. However, this is not restrictive. The communication apparatus 101 may transmit a reproduction start position based on the reproduction position and the reproduction start timing to the communication apparatus 102. The communication apparatus 101 may transmit the reproduction start position based on the reproduction position and the reproduction start timing to the communication apparatus 102 instead of transmitting the reproduction position obtained in step S506 of FIG. 5. In such a case, in step S610 of FIG. 6, the communication apparatus 102 can start to reproduce the content from the reproduction start position received from the communication apparatus 101.

The communication apparatus 102 may be an apparatus that, when the reproduction start timing has come, supports both the reproduction of the content from the reproduction start position based on the reproduction start timing and the reproduction position having been received by the communication apparatus 102 and the reproduction of the content from the reproduction start position received from the communication apparatus 101. In such a case, which reproduction start position the communication apparatus 102 uses to start reproducing the content, the reproduction start position based on the reproduction start timing and the reproduction position or the received reproduction start position, is set in the application that the communication apparatus 102 uses to reproduce the content. Alternatively, which reproduction start position to use may be preset in the communication apparatus 102.

According to the present exemplary embodiment, the communication apparatus 102 receives a reproduction instruction from the communication apparatus 101, then performs reproduction preparation for the content, and transmits a response to the reproduction instruction to the communication apparatus 101 after the reproduction start timing has come. However, this is not restrictive. The communication apparatus 102, after the reproduction preparation for the content, may transmit the response to the reproduction instruction to the communication apparatus 101 without waiting for the reproduction start timing to come. Specifically, the communication apparatus 102 performs the processing of step S604 in FIG. 6, and then performs the processing of steps S606 and S607. If the determination in step S607 is YES, the communication apparatus 102 may perform the processing of step S605. If the determination in step S605 is YES, the communication apparatus 102 performs the processing of step S608. If the determination in step S607 is YES, the communication apparatus 102 may perform the processing of step S609 in parallel with the determination of step S605.

Suppose that the communication apparatus 102 transmits the response to the reproduction instruction without waiting for the reproduction start timing to come. In such a case, if the determination in step S509 of FIG. 5 is YES, the communication apparatus 101 then determines whether the reproduction start timing has come. Specifically, the communication apparatus 101 performs the determination based on whether time as much as or more than indicated by the reproduction start timing determined in step S506 has elapsed since the transmission of the reproduction instruction in step S507. If the reproduction start timing indicates a specific time, the communication apparatus 101 performs the determination based on whether the time indicated by the reproduction start timing has elapsed. If the time as much as or more than indicated by the reproduction start timing has elapsed since the transmission of the reproduction instruction or if the specific time indicated by the reproduction start timing has elapsed, the communication apparatus 101 performs a determination of YES and performs the processing of step S510. On the other hand, if the time as much as or more than indicated by the reproduction start timing has not elapsed since the transmission of the reproduction instruction or if the specific time indicated by the reproduction start timing has not elapsed, the communication apparatus 101 performs a determination of NO, and repeats the determination.

As described above, if the communication apparatus 102 responds to the reproduction instruction with other than an OK response by returning the response without waiting for the reproduction start timing to come, the communication apparatus 101 and 102 can perform predetermined processing without waiting for the reproduction start timing to come.

If, in step S610, the reproduction start position based on the received reproduction position and the received reproduction start timing indicates a reproduction position after the end of the content, the communication apparatus 102 skips the processing of step S611 and performs the processing of step S612. In such a case, the communication apparatus 102 performs a determination of YES in step S612. When receiving the reproduction position and the reproduction start timing in step S603, the communication apparatus 102 may determine a reproduction start position from the reproduction position and the reproduction start timing and determine whether the reproduction start position indicates a reproduction position after the end of the content. If the reproduction start position indicates a reproduction positon after the end of the content, the communication apparatus 102 may perform the processing of step S606 to transmit an RTSP NG response to the communication apparatus 101. If the reproduction start position indicates a reproduction position after the end of the content, the communication apparatus 102 can thus improve the user convenience by not performing the processing for starting content redirection. Alternatively, before transmitting a reproduction instruction for the content in step S507, the communication apparatus 101 may determine a reproduction start position from the obtained reproduction position and the reproduction start timing determined in step S506 and determine whether the reproduction start position indicates a reproduction position after the end of the content. If the reproduction start position indicates a reproduction position after the end of the content, the communication apparatus 101 performs the processing of step S512 without transmitting a reproduction instruction in step S507. In such a case, the communication apparatus 101 performs a determination of YES in step S512. If the reproduction start position indicates a reproduction position after the end of the content, the communication apparatus 101 may notify the user that content redirection will not be started. If the reproduction start position indicates a reproduction position after the end of the content, the communication apparatus 101 thus does not transmit a reproduction instruction. Since the communication apparatus 101 and 102 do not perform the processing for starting content redirection, the user convenience may be improved.

According to the present exemplary embodiment, the communication apparatus 101 includes the reproduction position and the reproduction start timing in the same message as the reproduction instruction transmitted in step S507 of FIG. 5 and transmits the message. However, this is not restrictive. The reproduction position and the reproduction start timing may be included in a message different from the reproduction instruction and transmits the message. The communication apparatus 101 transmits the message after the transmission of the reproduction instruction in step S507 of FIG. 5 and before the receipt of the response to the reproduction instruction in step S508. The communication apparatus 102 receives the message after the receipt of the reproduction instruction in step S603 of FIG. 6 and before the completion of the reproduction preparation in step S604. In such a case, the communication apparatus 102 performs the determination in step S605 based on whether time as much as or more than indicated by the reproduction start timing has elapsed since the receipt of the message including the reproduction start timing.

According to the present exemplary embodiment, the communication apparatus 101 and 102 are described to reproduce the same content. However, this is not restrictive. The communication apparatus 101 and 102 may reproduce different contents. In such a case, the contents reproduced by the communication apparatus 101 and 102 are different from each other but need to be reproduced somewhat synchronously. This applies, for example, to a situation where the communication apparatus 102 reproduces a content having the same content as that of the content being reproduced by the communication apparatus 101 but with higher resolution. In another example, the communication apparatus 102 may reproduce a three-dimensional (3D) content having the same content as that of a two-dimensional (2D) content being reproduced by the communication apparatus 101.

According to the present exemplary embodiment, the communication apparatus 101 transmits the reproduction start timing of the content to the communication apparatus 102. However, this is not restrictive. For example, if the content is reproduced from the beginning, the reproduction start timing is not transmitted to the communication apparatus 102. Specifically, if the user gives an instruction to reproduce the content from the beginning when the user instructs the communication apparatus 101 to start content redirection, the communication apparatus 101 does not transmit the reproduction start timing of the content to the communication apparatus 102. If the user specifies a reproduction start position of the content when the user instructs the communication apparatus 101 to start content redirection, the communication apparatus 101 does not transmit the reproduction start timing of the content to the communication apparatus 102. In such cases, the communication apparatus 101 may skip the processing for determining the reproduction start timing in step S506 of FIG. 5. The communication apparatus 102 not receiving the reproduction start timing skips the processing of step S605 in FIG. 6, and in step S610, sets the reproduction position received from the communication apparatus 101 as the reproduction start position and starts to reproduce the content.

The procedures of the flowcharts illustrated in FIGS. 3 to 6 may be performed by a not-illustrated plurality of CPUs or apparatus in a distributed manner. In the case of distributed implementation with a plurality of apparatus, the source device operates as a source system, and the sink device operates as a sink system.

For example, the communication apparatus 101 may be a source system including a reproduction apparatus that reproduces a content and a processing apparatus that performs processing such as transmission of wireless signals. In performing the mirroring processing in step S307 of FIG. 3, the processing apparatus may perform encoding, multiplexing, and data transmission processing of sound being reproduced by the reproduction apparatus in addition to or instead of processing on the captured image of the screen being displayed by the reproduction apparatus. In step S506 of FIG. 5, the processing apparatus may obtain the reproduction position of the content being reproduced by the reproduction apparatus. If the communication apparatus 101 is a source system including a plurality of apparatus, which apparatus performs the processing of which step in FIGS. 3 and 5 is not limited thereto.

Similarly, the communication apparatus 102 may be a sink system including a reproduction apparatus that reproduces a content and a processing apparatus that performs processing such as transmission of wireless signals. In performing the mirroring processing in step S406 of FIG. 4, the reproduction apparatus may perform reproduction processing on the captured image that is received from the communication apparatus 101 and decoded. If audio data is received instead of or in addition to the captured image, the reproduction apparatus may perform reproduction processing on the audio data decoded. In step S605 of FIG. 6, the processing apparatus may determine whether the reproduction start timing has come. In step S610 of FIG. 6, the processing apparatus may control start of reproducing the content from the reproduction start position based on the reproduction position and the reproduction start timing received from the communication apparatus 101. If the communication apparatus 102 is a sink system including a plurality of apparatus, which apparatus performs the processing of which step in FIGS. 4 and 6 is not limited thereto.

At least part or all of the flowcharts of the communication apparatus 101 and 102 illustrated in FIGS. 3 to 6 may be implemented by hardware. For hardware implementation, for example, dedicated circuits generated on a field programmable gate array (FPGA) from the computer programs for implementing the foregoing steps by using a predetermined complier may be used. Like an FPGA, a gate array circuit may be formed for hardware implementation. An application specific integrated circuit (ASIC) may be used for the implementation.

An exemplary embodiment of the present invention may be implemented by processing for supplying a program for implementing one or more functions of the foregoing exemplary embodiments to a system or an apparatus via a network or a storage medium, and reading and executing the program by one or more processors of a computer of the system or apparatus. A circuit for implementing one or more functions (for example, ASIC) may be used for the implementation.

According to an exemplary embodiment of the present invention, a difference in reproduction positions can be reduced between a communication apparatus that is reproducing a content stored in an external apparatus and a communication apparatus that receives a reproduction instruction for the content from the communication apparatus and reproduces the content.

According to an exemplary embodiment of the present invention, a difference in reproduction positions can be reduced between a communication apparatus that is reproducing a content stored in an external apparatus and a communication apparatus different from the foregoing communication apparatus that receives a reproduction instruction for the content from the foregoing communication apparatus and reproduces the content.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-116885, filed Jun. 20, 2018, which is hereby incorporated by reference herein in its entirety.

What is claimed is:

1. A communication apparatus comprising:
one or more processors; and
one or more memories including instructions that, when executed by the one or more processors, cause the communication apparatus to:
receive, while another communication apparatus is reproducing a content stored in an external apparatus, an instruction for causing the communication apparatus to obtain the content from the external apparatus and reproduce the obtained content, first information indicating a specific position of the content being reproduced by the another communication apparatus, and second information indicating a start timing until which the reproducing of the content is suspended and at which the communication apparatus starts to reproduce the content, from the another communication apparatus; and control, in a case where the start timing has come, start of reproducing the content, wherein the reproducing of the content is started from a position that is determined based on the first information and the second information.

2. The communication apparatus according to claim 1, wherein the instruction, the first information, and the second information are received by a single message.

3. The communication apparatus according to claim 1, wherein a second message including the first information and the second information is received after receipt of a first message including the instruction.

4. The communication apparatus according to claim 1, wherein the second information indicates a time period from when the communication apparatus receives the second information until when the communication apparatus starts to reproduce the content.

5. The communication apparatus according to claim 1, wherein the second information indicates a predetermined time that is after transmission of the second information by the another communication apparatus.

6. The communication apparatus according to claim 1, the execution of the instructions further causes the communication apparatus to:

receive data based on at least either one of a screen display and sound reproduction performed by the another communication apparatus reproducing the content; and reproduce the received data in such a manner that at least either one of the screen display and the sound reproduction is shared with the another communication apparatus, wherein the instruction is received while the data is being reproduced.

7. The communication apparatus according to claim 6, the execution of the instructions further causes the communication apparatus to:

transmit a response to the received instruction to the another communication apparatus based on a fact that the start timing has come; and stop reproduction of the data when the response is transmitted, wherein the start of reproducing the content is controlled after the reproduction is stopped.

8. The communication apparatus according to claim 1, wherein the instruction is received according to a method compliant with a Wi-Fi Miracast standard.

9. The communication apparatus according to claim 1, the execution of the instructions further causes the communication apparatus to:

synchronize a time with the another communication apparatus before receipt of the second information.

10. The communication apparatus according to claim 1, the execution of the instructions further causes the communication apparatus to:

perform a reproduction preparation for the content based on receipt of the instruction, wherein the reproduction preparation is processing including activation of an application for reproducing the content.

11. The communication apparatus according to claim 10, wherein the reproduction preparation is processing including login on a website or service for reproducing the content.

12. The communication apparatus according to claim 10, wherein the reproduction preparation is processing including initialization of at least either one of an image decoder and an audio decoder.

13. The communication apparatus according to claim 10, wherein the reproduction preparation is processing including obtaining of the content form the external apparatus.

14. A communication apparatus comprising:

one or more processors; and one or more memories including instructions that, when executed by the one or more processors, cause the communication apparatus to:

reproduce a content stored in an external apparatus;

obtain, while the content is being reproduced, a specific position of the content; and transmit, while the content is being reproduced, an instruction for causing another communication apparatus to obtain the content from the external apparatus and reproduce the obtained content, first information indicating the obtained specific position, and second information indicating a start timing until which the reproducing of the content is suspended and at which the another communication apparatus starts to reproduce the content, to the another communication apparatus.

15. The communication apparatus according to claim 14, wherein the instruction, the first information, and the second information are received by a single message.

16. The communication apparatus according to claim 14, wherein a second message including the first information and the second information is transmitted after transmission of a first message including the instruction.

17. The communication apparatus according to claim 14, wherein the second information indicates a time period from when the another communication apparatus receives the second information until when the another communication apparatus starts to reproduce the content.

18. The communication apparatus according to claim 14, wherein the second information indicates a predetermined time that is after transmission of the second information by the communication apparatus.

19. The communication apparatus according to claim 14, the execution of the instructions further causes the communication apparatus to:

transmit data based on at least either one of a screen display and sound reproduction performed by the communication apparatus reproducing the content stored in the external apparatus in such a manner that at least either one of the screen display and the sound reproduction is shared with the another communication apparatus, wherein the instruction is transmitted while the data is being transmitted.

20. The communication apparatus according to claim 19, the execution of the instructions further causes the communication apparatus to:

receive a response to the transmitted instruction from the another communication apparatus; and stop transmission of the data when the response.

21. The communication apparatus according to claim 14, wherein the instruction is transmitted according to a method compliant with a Wi-Fi Miracast standard.

22. The communication apparatus according to claim 14, the execution of the instructions further cause the communication apparatus to:
    synchronize a time with the another communication apparatus before transmission of the second information.

23. A non-transitory computer-readable storage medium storing a computer program for causing a computer to execute a control method of a communication apparatus, the control method comprising:
    receiving, while another communication apparatus is reproducing a content stored in an external apparatus, an instruction for causing the communication apparatus to obtain the content from the external apparatus and reproduce the obtained content, first information indicating a specific position of the content being reproduced by the another communication apparatus, and second information indicating a start timing until which the reproducing of the content is suspended and at which the communication apparatus starts to reproduce the content from the another communication apparatus; and
    controlling, in a case where the start timing has come, start of reproducing the content, wherein the reproducing of the content is started from a position that is determined based on the first information and the second information.

24. A non-transitory computer-readable storage medium storing a computer program for causing a computer to execute a control method of a communication apparatus, the control method comprising:
    reproducing a content stored in an external apparatus;
    obtaining, while the content is being reproduced, a specific position of the content; and
    transmitting, while the content is being reproduced, an instruction for causing another communication apparatus to obtain the content from the external apparatus and reproduce the obtained content, first information indicating the obtained specific position, and second information indicating a start timing until which the reproducing of the content is suspended and at which the another communication apparatus starts to reproduce the content, to the another communication apparatus.

25. A control method for controlling a communication apparatus, the control method comprising:
    receiving, while another communication apparatus is reproducing a content stored in an external apparatus, an instruction for causing the communication apparatus to obtain the content from the external apparatus and reproduce the obtained content, first information indicating a specific position of the content being reproduced by the another communication apparatus, and second information indicating a start timing until which the reproducing of the content is suspended and at which the communication apparatus starts to reproduce the content, from the another communication apparatus; and
    controlling, in a case where the start timing has come, start of reproducing the content, wherein the reproducing of the content is started from a position that is determined based on the first information and the second information.

26. A control method for controlling a communication apparatus, the control method comprising:
    reproducing a content stored in an external apparatus;
    obtaining, while the content is being reproduced, a specific position of the content; and
    transmitting, while the content is being reproduced, an instruction for causing another communication apparatus to obtain the content from the external apparatus and reproduce the obtained content, first information indicating the obtained specific position, and second information indicating a start timing until which the reproducing of the content is suspended and at which the another communication apparatus starts to reproduce the content, to the another communication apparatus.

* * * * *